April 21, 1925.

W. S. SOUTHWICK 1,534,034

APPARATUS FOR ELECTRICALLY WELDING WIRE FABRIC

Filed Dec. 10, 1921    13 Sheets-Sheet 1

Inventor
William S. Southwick
by Wright Brown Quimby May
Attorneys

April 21, 1925.  1,534,034
W. S. SOUTHWICK
APPARATUS FOR ELECTRICALLY WELDING WIRE FABRIC
Filed Dec. 10, 1921   13 Sheets-Sheet 2
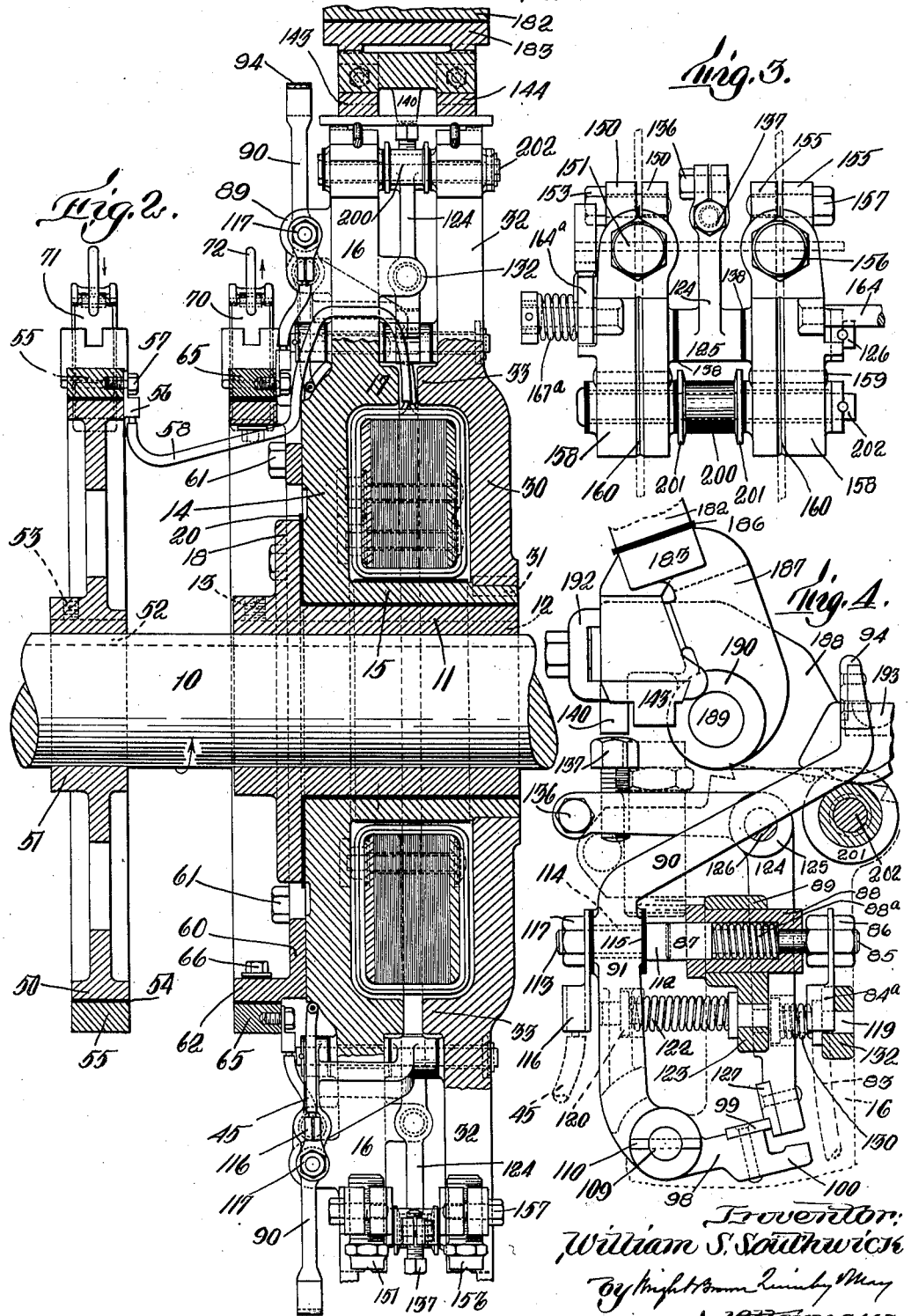

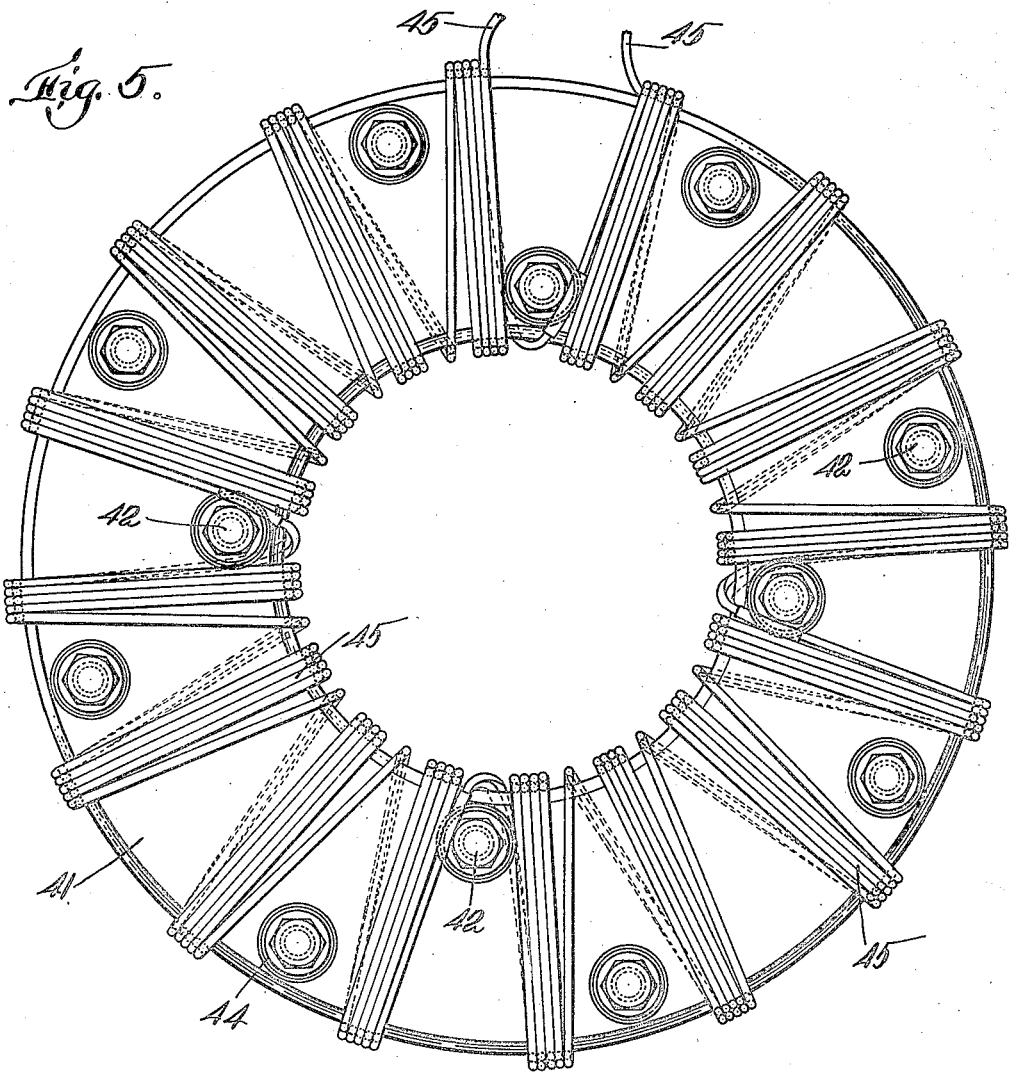
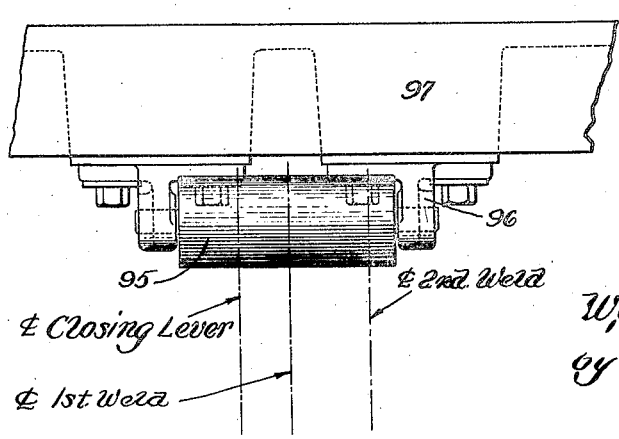

April 21, 1925. 1,534,034
W. S. SOUTHWICK
APPARATUS FOR ELECTRICALLY WELDING WIRE FABRIC
Filed Dec. 10, 1921 13 Sheets-Sheet 4

Inventor:
William S. Southwick

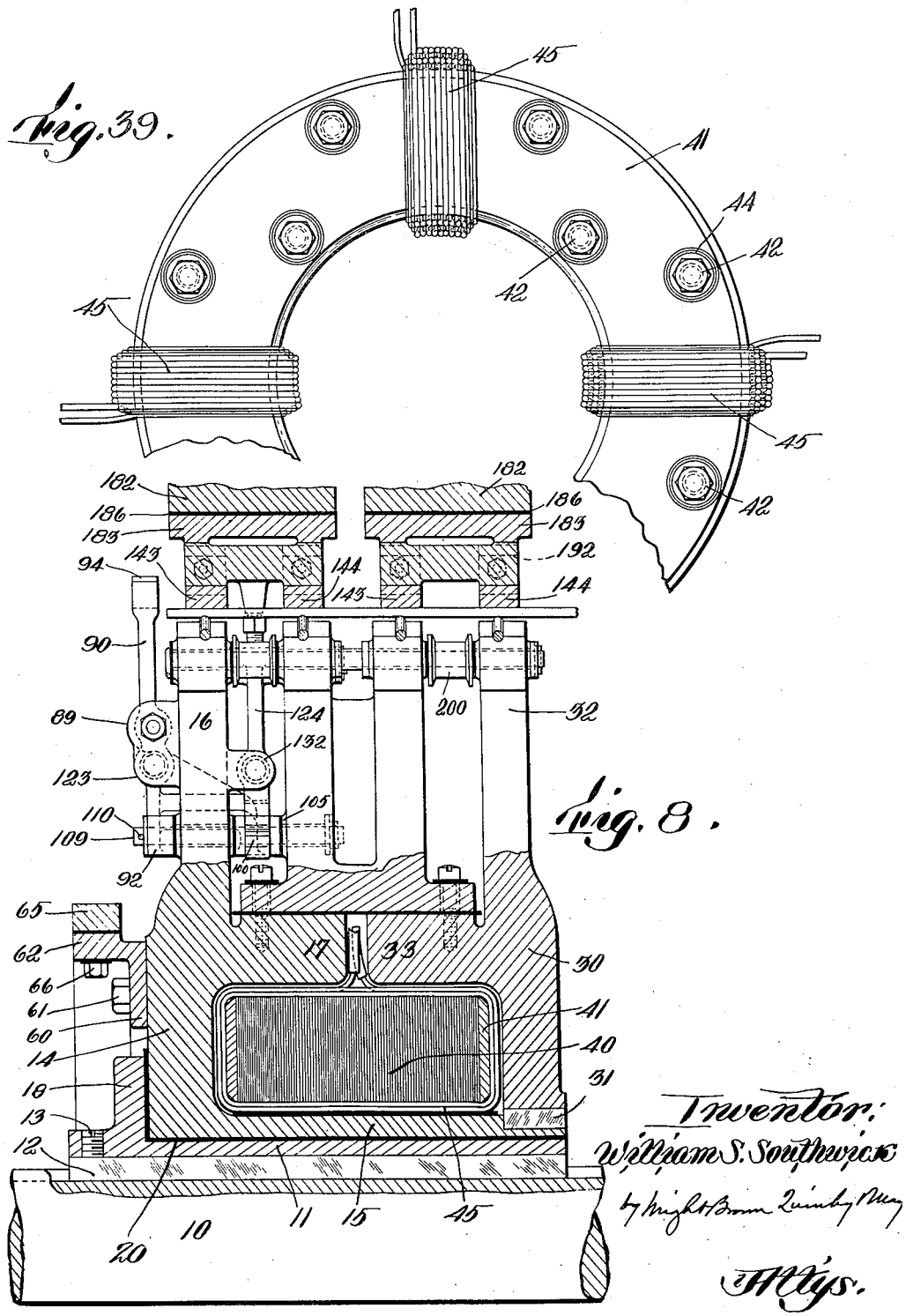

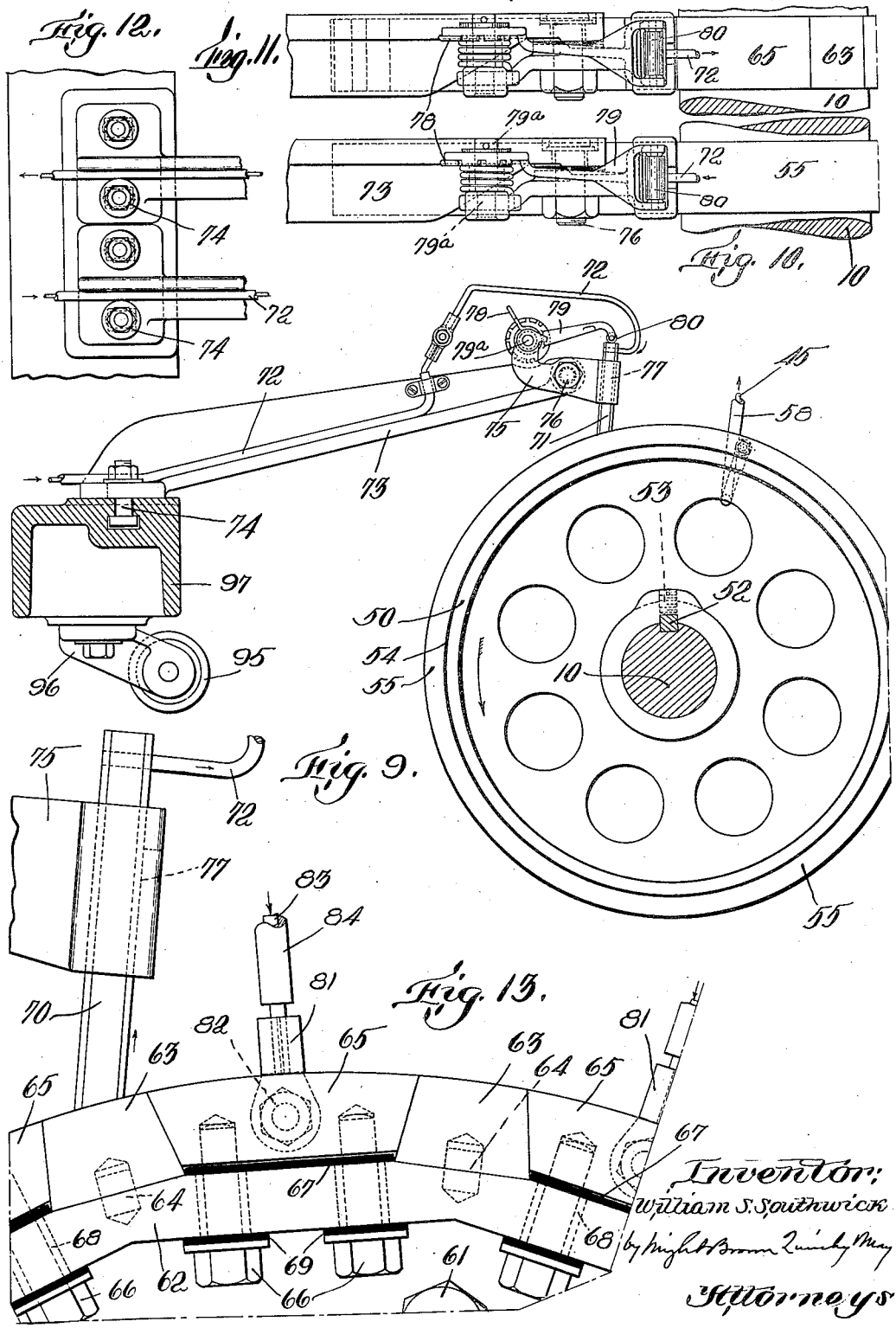

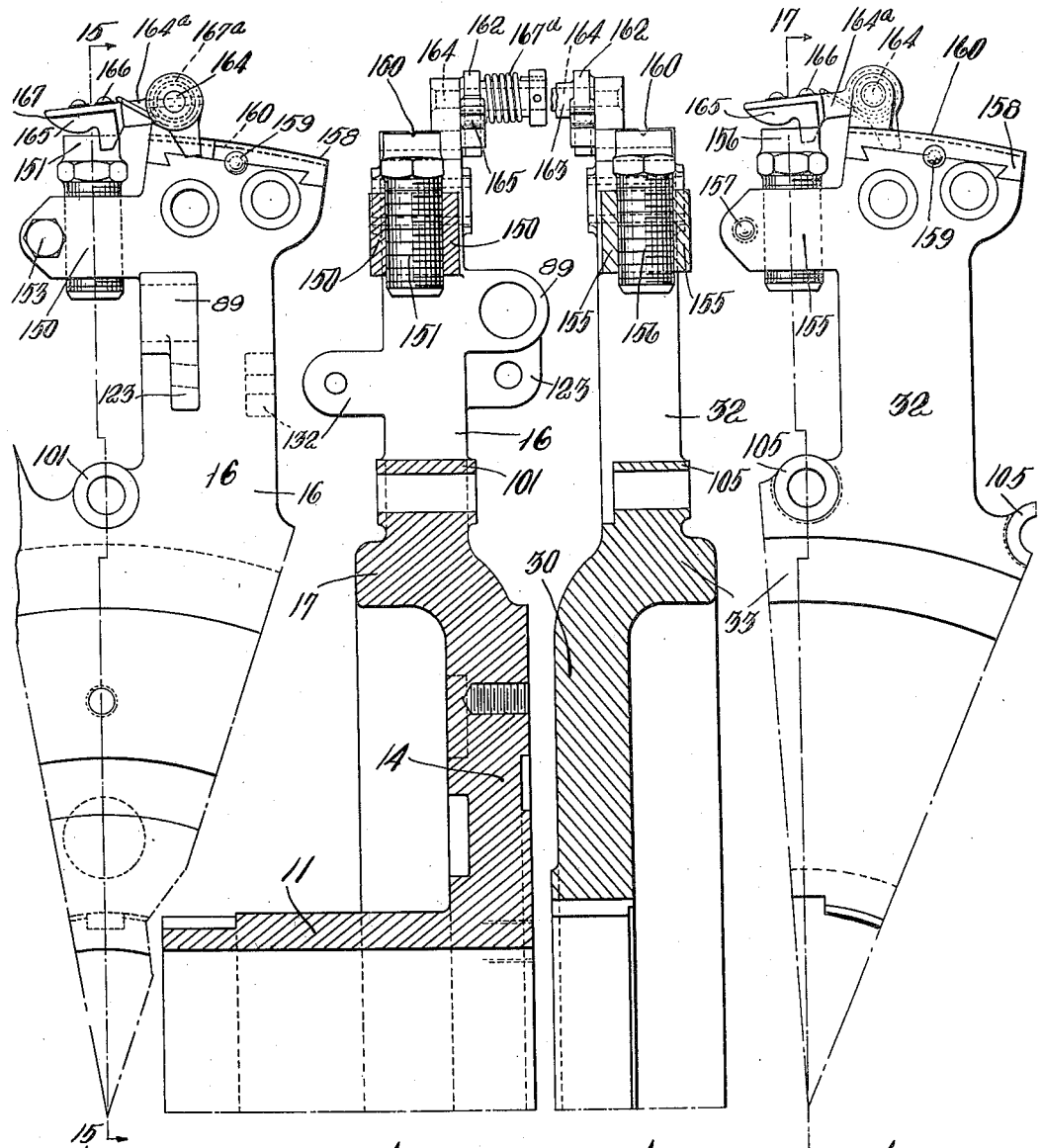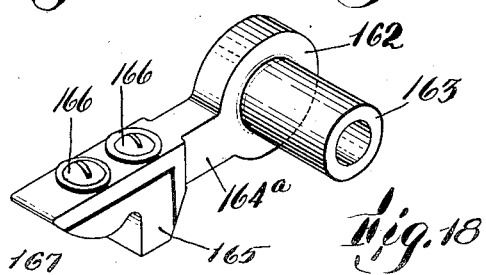

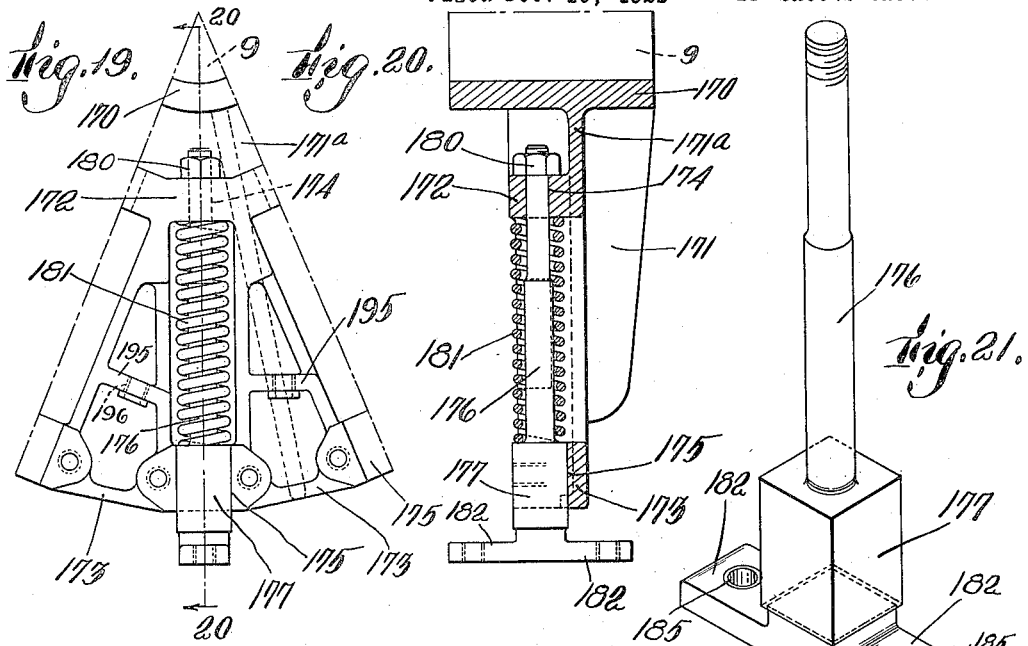
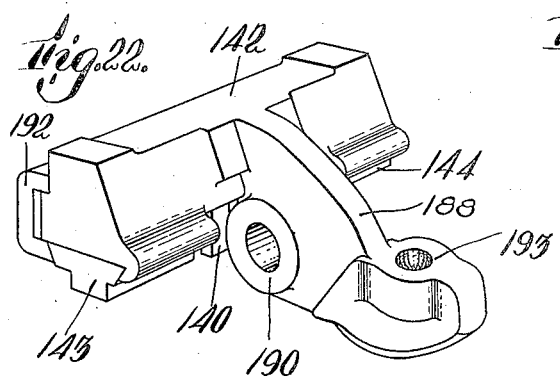
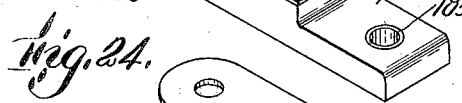
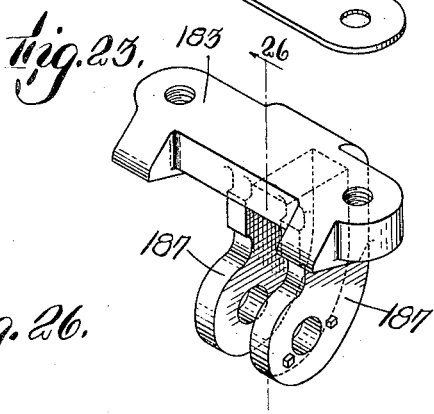
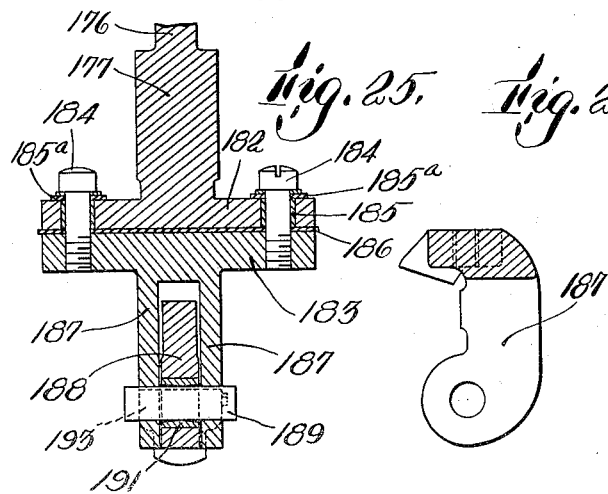

April 21, 1925. 1,534,034
W. S. SOUTHWICK
APPARATUS FOR ELECTRICALLY WELDING WIRE FABRIC
Filed Dec. 10, 1921 13 Sheets-Sheet 9
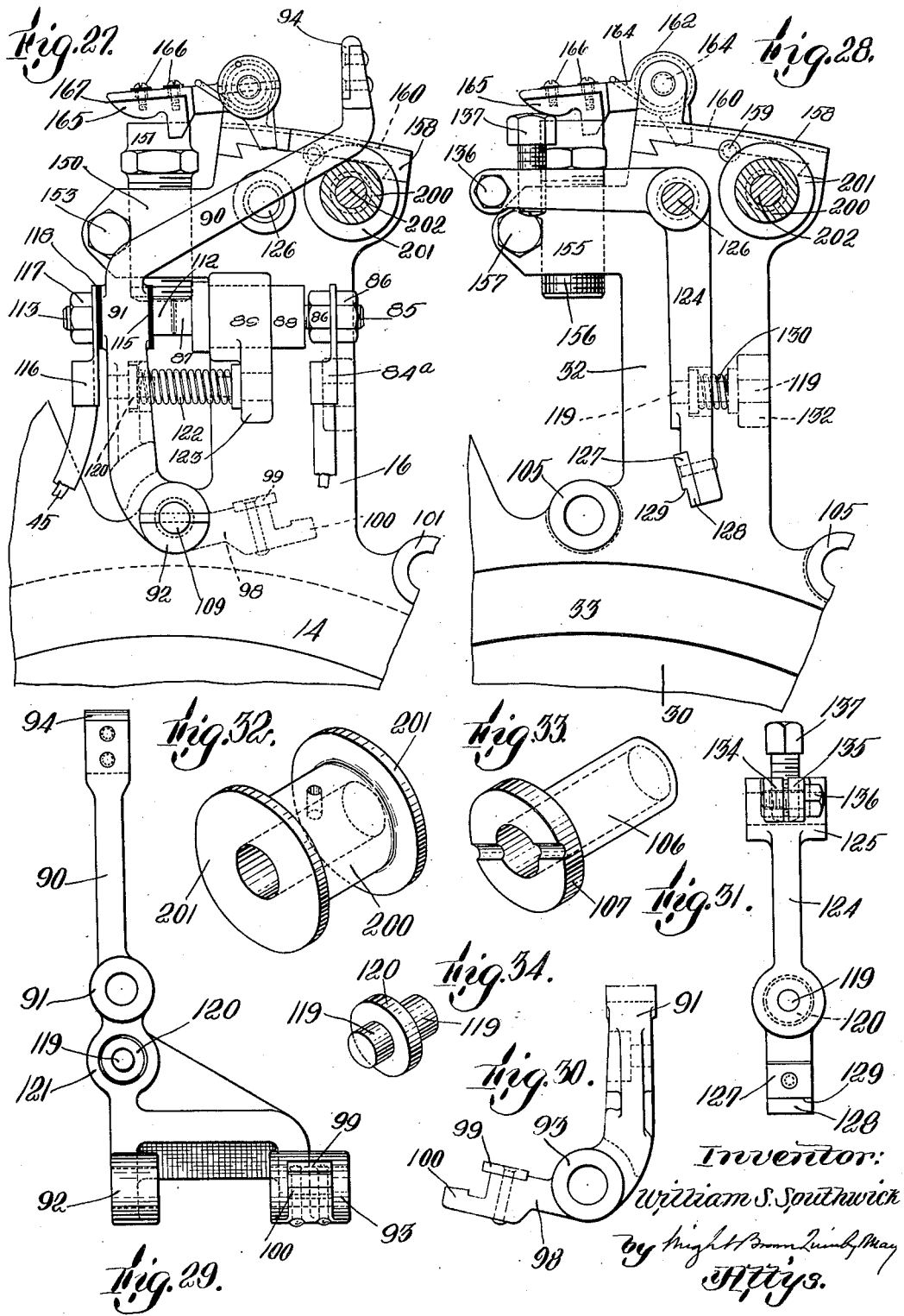

April 21, 1925.
W. S. SOUTHWICK
1,534,034
APPARATUS FOR ELECTRICALLY WELDING WIRE FABRIC
Filed Dec. 10, 1921    13 Sheets-Sheet 10
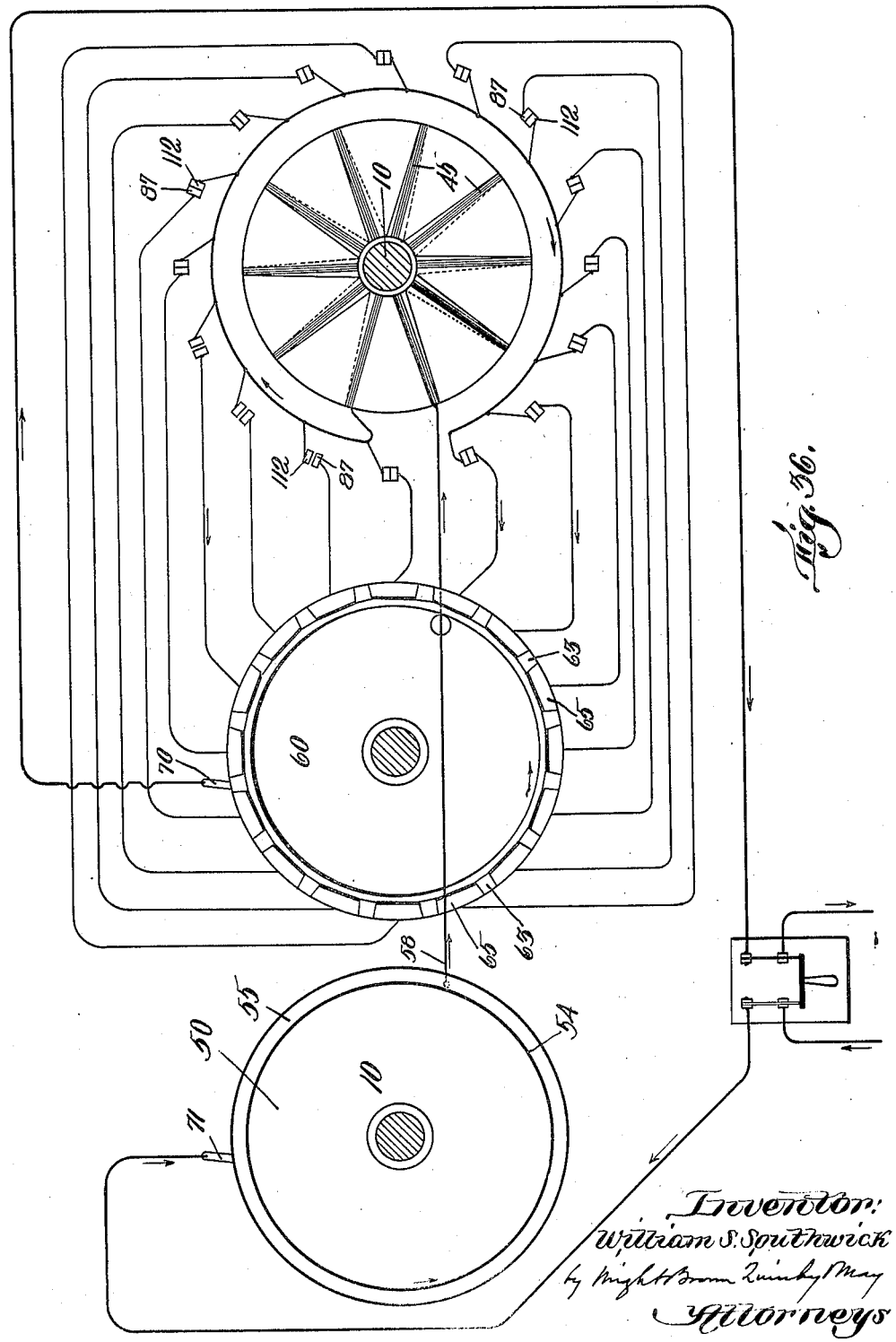

April 21, 1925. 1,534,034
W. S. SOUTHWICK
APPARATUS FOR ELECTRICALLY WELDING WIRE FABRIC
Filed Dec. 10, 1921 13 Sheets-Sheet 11

Inventor:
William S. Southwick

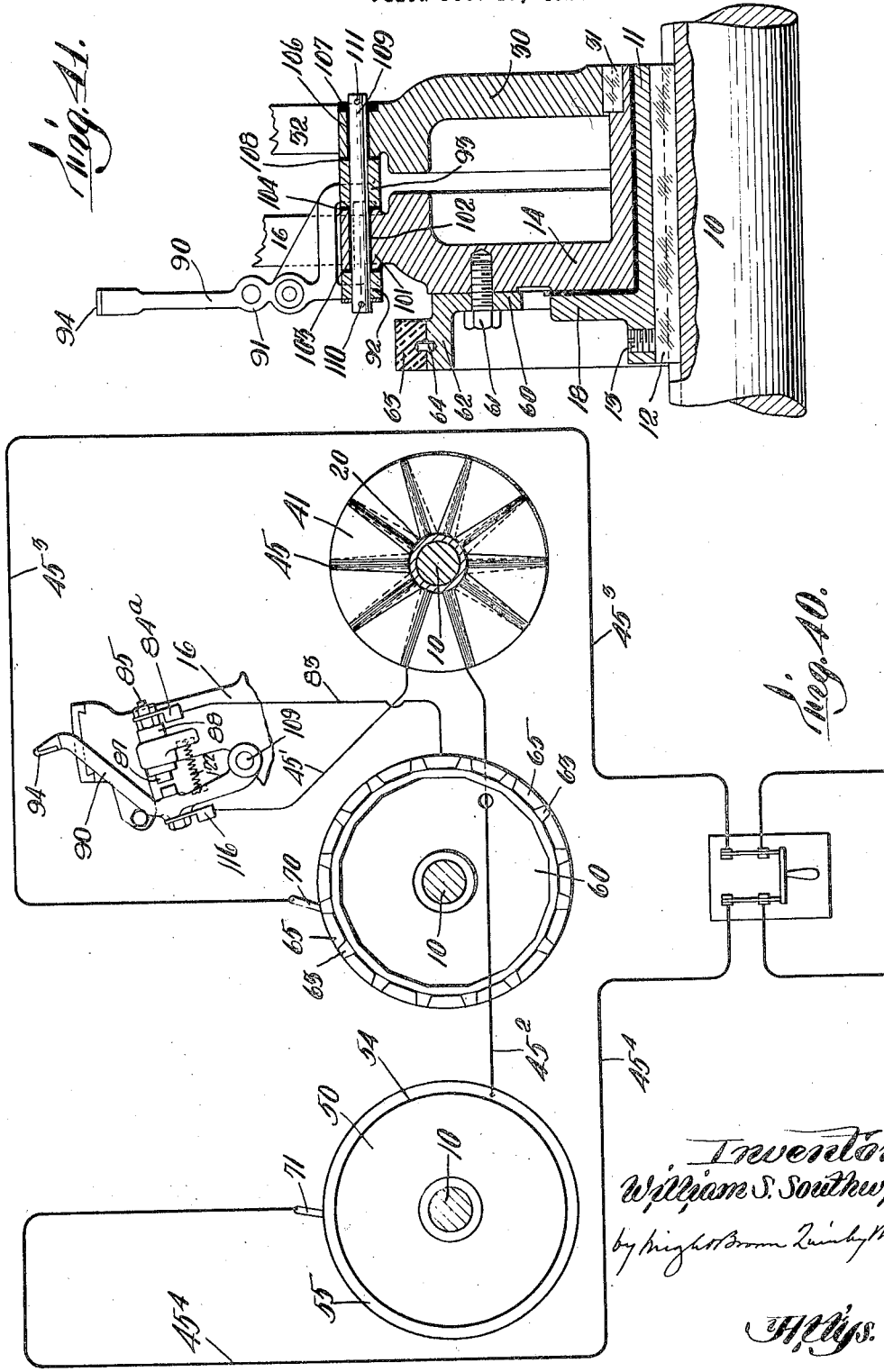

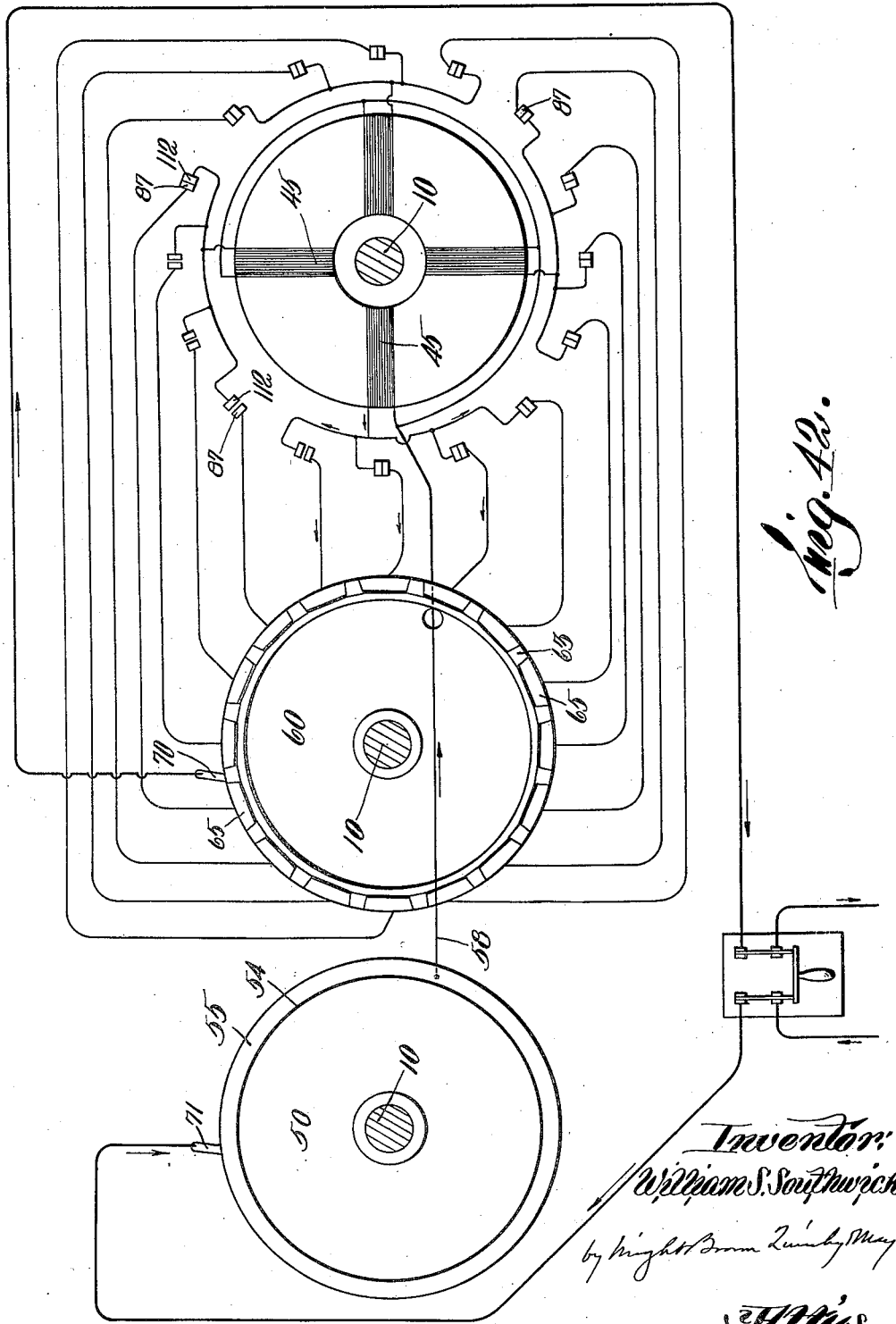

Patented Apr. 21, 1925.

1,534,034

UNITED STATES PATENT OFFICE.

WILLIAM S. SOUTHWICK, OF CLINTON, MASSACHUSETTS, ASSIGNOR, BY MESNE ASSIGNMENTS, TO WICKWIRE SPENCER STEEL COMPANY, OF NEW YORK, N. Y., A CORPORATION OF DELAWARE.

APPARATUS FOR ELECTRICALLY WELDING WIRE FABRIC.

Application filed December 10, 1921. Serial No. 521,370.

*To all whom it may concern:*

Be it known that I, WILLIAM S. SOUTHWICK, a citizen of the United States, residing at Clinton, in the county of Worcester and State of Massachusetts, have invented new and useful Improvements in Apparatus for Electrically Welding Wire Fabric, of which the following is a specification.

This invention relates to a method and apparatus for electrically welding the component members of wire fabrics at points of intersection and consists in the novel construction and the arrangement of parts fully described in this specification, clearly illustrated in the drawings and particularly pointed out in the claims.

In the drawings like symbols are used to indicate like parts wherever they occur.

Figure 1 in side elevation shows two complemental series of welding units designed to be associated with a transformer constructed in accordance with my invention, a part of each series of welding units being omitted for want of space.

Figure 2 is a sectional view on the line 2—2 of Figure 1, looking in the direction of the arrows and showing the shaft, upon which is splined a flanged sleeve; upon this flanged sleeve and insulated therefrom is mounted a copper hub, one end of which is formed with an integral generally disc-shaped copper member that is secured to but insulated from the flange 18 of the sleeve 11, a companion disc-shaped copper member 30 formed with a central opening being pressed upon and secured to the opposite end of the copper hub 15, said copper members having extensions or arms on which welding jaws are mounted; in a chamber between the two disc-shaped copper members is mounted a series of ring-shaped laminated iron plates arranged side by side constituting a core; around the latter is the primary winding; this view also shows means for connecting the primary windings with the source of power and other features hereinafter detailed.

Figure 3 is a plan view of one pair of welding jaws or electrodes carried by the arms of the secondaries in Figure 2.

Figure 4 is a view partly in section and partly in elevation of the members constituting the break switch, the members being supported and carried by parts associated with the lower welding jaws in Figure 2 or the jaws mounted on the arms or extensions of the copper members; in this view at the top appears a side elevation of the outer or complemental welding jaw.

Figure 5, in side elevation, shows the form of core and primary windings illustrated in Figure 2, separated from the rest of the mechanism for the sake of clearness.

Figure 6:
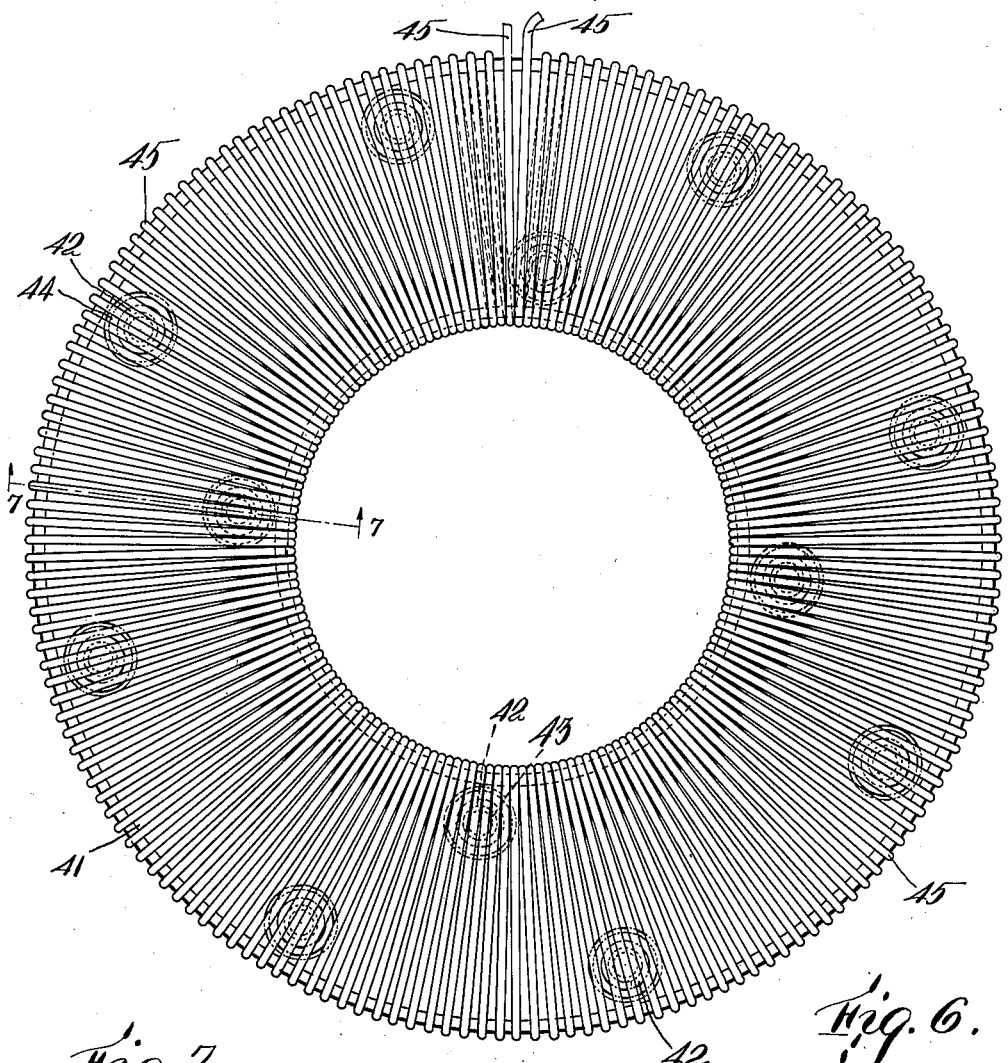

Figure 6 is a similar view showing a modified arrangement of the primary winding.

Figure 7:
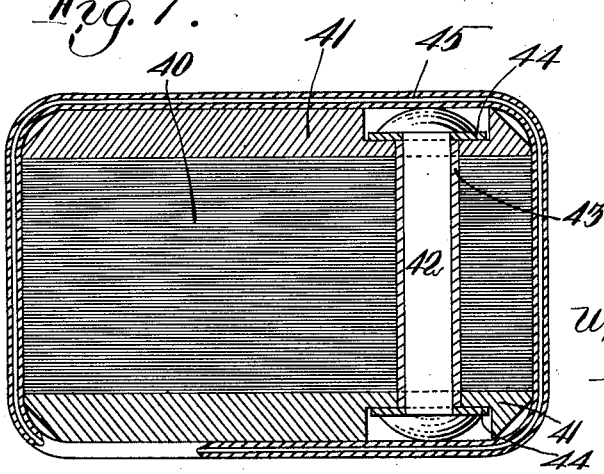

Figure 7 is a sectional view on the line 7—7 of Figure 6 looking in the direction of the arrow showing the laminated plates, the binding plates, and one of the insulated rivets for binding the laminated plates and binding plates together as indicated; also showing the primary winding mostly in section, here appearing as a wire covered with insulating material.

Figure 8 is a detail view showing a modified form of the electrodes or secondary terminals permitting four welds to be made simultaneously, parts of the transformer being shown in section.

Figure 9 is an elevation of the parts shown at the extreme left in Figure 2, directly under the inscription Figure 2, by which the primary current is conducted to and from the source of power to the primary winding of the transformer.

Figure 10 is a top plan view showing the parts illustrated in Figure 9.

Figure 11 is a top plan view of the ring shown in Figure 2 bolted to the left side of the secondary member of the transformer, which, also, conducts the current to and from the source of power.

Figure 12 is a top plan view of the parts shown at the left in Figure 9.

Figure 13 is a detail view of the brush member represented in Figure 11 and a portion of the ring that is bolted to the face of the secondary in Figure 2. In this view the brush is shown in contact with one of the plugs of insulating material forming a part of the periphery of this ring.

Figure 1:
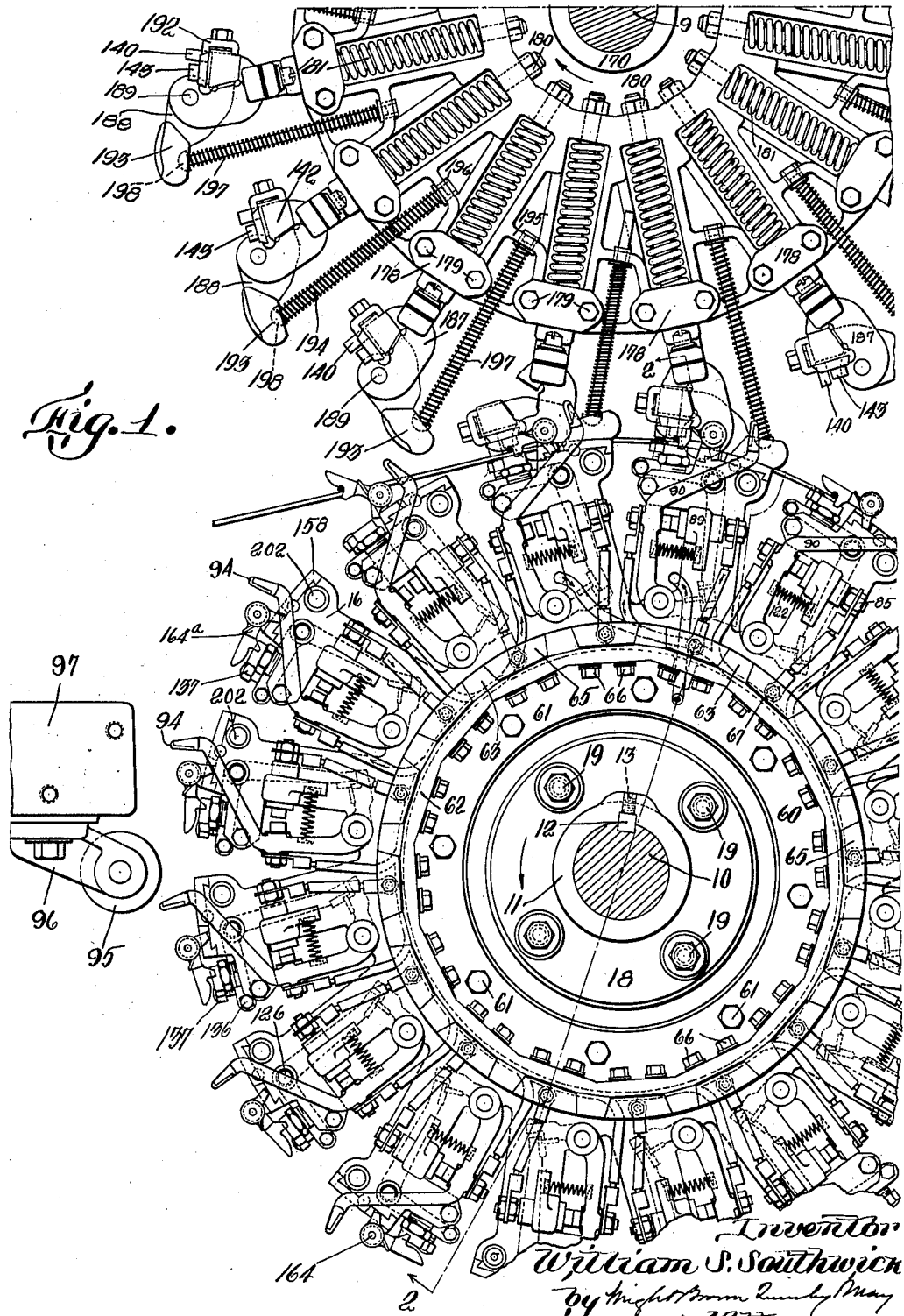

Figure 14 is a side elevation of one of the radial arms shown associated with the mechanism of the lower shaft in Figure 1.

Figure 15 is a vertical sectional view on the line 15—15 of Figure 14 looking in the direction of the arrow showing the specific construction of this part.

Figure 16 is a side elevation of the complemental arm to that shown in Figure 14, both arms being connected with mechanism carried by the lower shaft in Figure 1.

Figure 17 is a vertical sectional view on the line 17—17 of Figure 16 looking in the direction of the arrows and showing the construction of the parts, the dog for feeding the stay wire being shown in end elevation at the extreme top of the figure.

Figure 18 is a detail perspective view of one of the dogs for feeding the stay wire.

Figure 19 is a side elevation of one of the radial members associated with the parts carried by the upper shaft in Figure 1 or the shaft not carrying the transformers but carrying the upper welding jaws.

Figure 20 is a vertical sectional view on the line 20—20 of Figure 19 looking in the direction of the arrows showing the construction and arrangement of the parts.

Figure 21 is a detail perspective view of the plunger shown in Figures 19 and 20.

Figure 22 is a detail perspective view of a bridge piece carried by one of the castings shown in Figure 23.

Figure 23 represents a casting adapted to be connected to the lower face of one of the plungers shown in Figure 21, the part shown in Figure 22 being designed to be held between the ears of this casting.

Figure 24 is a detail perspective view of a strip of insulating material adapted to be arranged between the lower face of the plunger of Figure 21 and the upper face of the casting shown in Figure 23.

Figure 25 is a vertical sectional view showing the parts of Figures 21, 22, 23 and 24 assembled and connected together.

Figure 26 is a vertical sectional view on the line 26—26 of Figure 23 looking in the direction of the arrows.

Figure 27 is a detail view showing in side elevation one of the extensions of the secondary carried by the lower shaft, and also showing a part of the break switch, and also showing one of the dogs for feeding and holding the stay wires until they are welded.

Figure 28 is a like view of a companion arm to that shown in Figure 27 and having the extension of one of the secondaries on the lower shaft, see Figure 2; a complemental break switch member is also shown.

Figure 29 is a front elevation of the break switch member shown in Figure 27.

Figure 30 is a side elevation of the lower part of the break switch member shown in Figures 27 and 29; in this figure the illustration stops at the centre of the third hub from the bottom in Figure 29.

Figure 31 is an end elevation of the break switch member shown as carried by the arm in Figure 28.

Figure 32 is a detail perspective view of one of a series of rolls carried at the extremity of the secondary arms supported on the lower shaft, as shown in Figure 2.

Figure 33 is a detail perspective view of an insulating bushing shown in dotted lines at the upper right hand part of Figures 27 and 28.

Figure 34 is a detail perspective view of a short cylindrical piece provided with a ring at its central part, the cylinder and ring being integral or fastened together, composed of insulating material designed to support one end of a coiled spring, as shown in Figures 27 and 28.

Figure 35, sheet 3, is a detail view of the roll for operating the closing switch levers, this roll appearing at the left in Figure 1 in operative position with relation to the levers carried by members of the lower shaft.

Figure 36 is a diagrammatic view of the primary circuits with their break switches.

Figure 37:
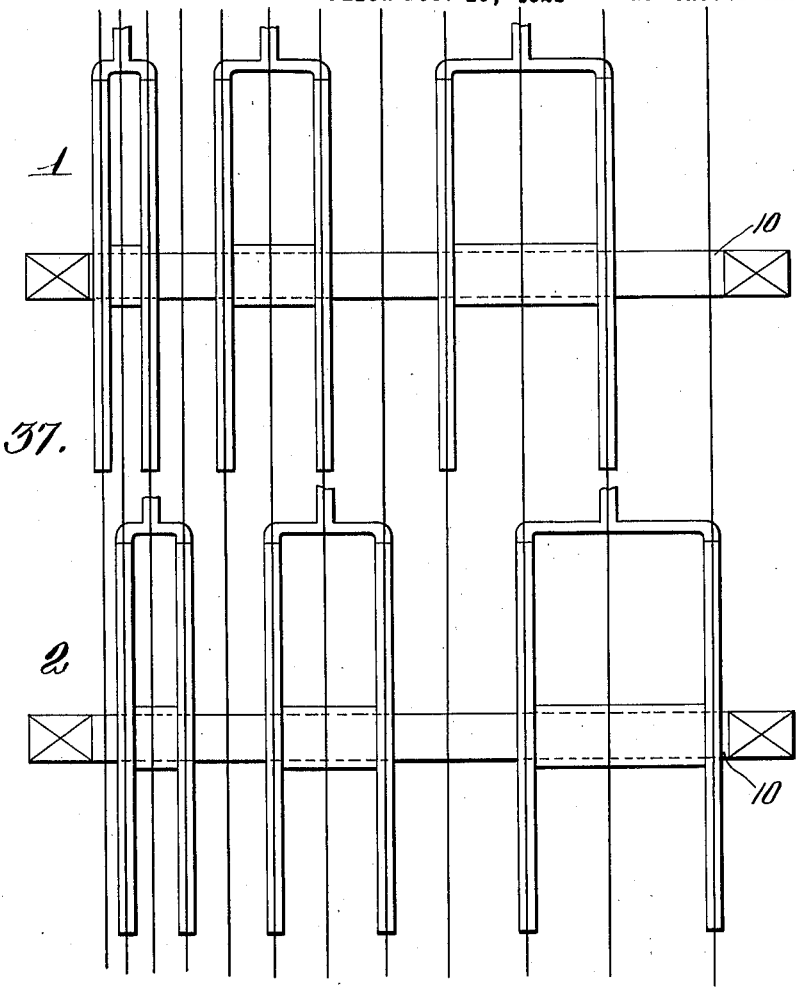

Figure 37 is a diagrammatic view of an arrangement of welding units for welding closely positioned strand wires; two sets of welding units appear in this figure positioned and arranged to weld in sequence.

Figure 38:
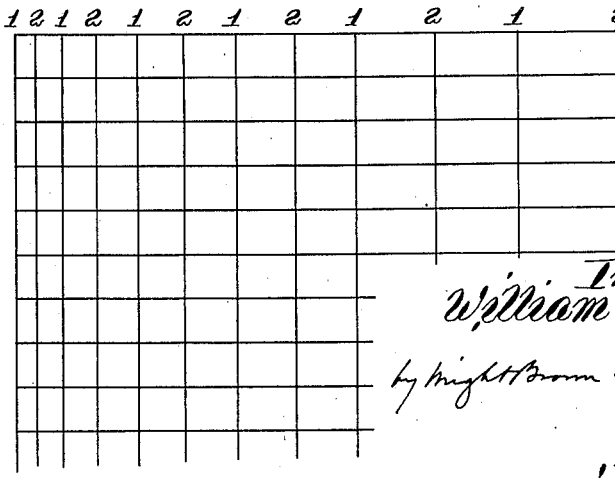

Figure 38 is a diagrammatic view of a fabric with closely positioned strand wires; the strand wires in this figure run from the top to the bottom of the figure, the stay wires run from the left to the right of the figure; this view represents a fabric produced by the arrangement of welding units in Figure 37, the symbol 1 representing the strand wire to which stay wires are welded by the welding unit marked 1 in Figure 37, while the symbol 2 represents the strand wire to which stay wires are welded by the welding unit marked 2 in Figure 37.

Figure 39 is a diagrammatic view of another arrangement of the primary winding of the transformer.

Figure 40 is a diagrammatic view showing the primary circuit from the main switch or source of power to the transformer and from the transformer to one of the break switches and from the break switch back to the main switch or source of power.

Figure 41 is a detail view partly in section showing the method of mounting one of the break switch levers on the secondary bars or arms of the transformer carried by the lower shaft in Figures 1 and 2.

Figure 42 is a diagrammatic view of the circuits of a rotary welding machine employing my rotating transformer where the primary winding is arranged on the core in four groups, as shown in Figure 39, each group being connected up to four welding units; the arrangement of circuits for different numbers of welding jaws to a group or different number of groups is a matter that those skilled in the art will readily understand without further description.

In my Patent No. 1,367,212, dated February 1, 1921, I have disclosed and claimed a new and useful improvement in rotary welding machines. In the machine of that patent, the transformers are stationary and the current is transferred from each transformer to its associated welding jaws by a sliding contact.

Patent to Perry No. 633,214, dated September 19, 1899, shows a revoluble welding machine in which the transformers, instead of being stationary on the framework are revoluble and are mounted on the under side of plates or beams carried by a rotating shaft. The welding jaws being connected to and supported by said beams are also revoluble. In this patent no new construction of transformer is suggested, merely the attachment of the transformer to the revolvable part carrying the welding jaws; the old sliding contact at one point at least between the transformer and one of the welding jaws is retained.

The present invention relates to a rotatable transformer adapted to rotate on its own axis, constructed to be connected positively to complemental welding jaws, and embraces a rotary welding machine provided with such transformer and its directly associated elements.

In the drawings of this application, I have illustrated my new rotating transformer and so much of the parts of the rotary welding machine of my prior patent as is necessary to illustrate the practical connection and operation of said transformer in such a machine. Reference may be made, and is invited, to said patent for a detailed description and illustration of the structure and operation of such a welding machine. No attempts are made in this specification to have the reference symbols for the parts of the welding machine proper correspond to the reference symbols employed in my said prior patent for the same parts.

While I have illustrated and described my improved transformer in connection with the rotary welding machine of my prior patent, I do not wish to be understood as limiting my invention to such use or as suggesting that my improved transformer is intended to be limited to such use, as I intend and design it for use in any relation where a rotating transformer is desired or employed.

Referring to Figures 1 and 2,—9 represents a shaft corresponding to the shaft $C^7$ of my prior patent and carrying parts that cooperate with the welding jaws of the lower shaft 10 that is adapted to be mounted in suitable bearings in the framework and driven after the general manner of the shaft $C^4$ of my prior patent. This shaft 10 is the main shaft of the machine, and supports and rotates the several transformers and their associated parts. The welding jaws in this application are constructed and arranged in principle like the welding jaws of my prior patent, whereby two welds are made simultaneously at each welding operation by each pair or the series of pairs of welding jaws extending radially and carried by and positively connected to the secondary bars of the transformer. In this application the entire transformer, including the core, coils and secondary bars and extensions of the secondary bars carrying the welding jaws, is mounted on, secured to, insulated from the flanged sleeve 11 by the insulating material 20, see Figures 2 and 8, and thus rotated by the shaft 10 whereby the sliding contact of the secondary circuit of my prior patent and sliding contact of one of the jaws of the prior Perry patent are avoided. By this construction, the sleeve 11 and the transformer can be slid on and off the shaft or positioned on the shaft, or, by removing the bolts 19, see Figure 1, by which the transformer is secured to the flange 18 of the sleeve 11, the transformer itself can be removed from the sleeve. This is a matter of considerable advantage and convenience in assembling the parts or in making repairs.

11 represents a flanged sleeve arranged on the shaft 10 and rigidly secured thereto by a key 12 arranged in a complemental spline or groove in the shaft and hub. 13 represents a set screw arranged in the flanged sleeve engaging the key to maintain the latter in position. 14 represents a copper flange formed at its base with a hub 15 also of copper and a continuation of the flange 14; said copper hub 15 being of sufficient length, as shown in Figure 2, to extend completely under and beyond the core space for a sufficient distance to receive upon it a complemental copper flange hereinafter described. By this construction, among other advantages, a joint is avoided between the copper flange 14 and the hub 15, and a joint is avoided between the copper flanges 14 and 30 and the sleeve 11 or any other supporting or driving member. This is an advantage in avoiding the loss of current due to leakage through joints. The flange 14 at its periphery is formed with a series of radial arms 16. At the base of the radial arm 16, flange 14 is formed with an annular extension 17 above and concentric with the outer surface of the copper hub 15; the space between the copper hub 15 and the annular extension 17 forms one side of the chamber for the core and its windings. As shown in Figures 1 and 2, the sleeve 11 is formed with a radial flange 18. The copper hub 15 is slid on to the sleeve 11 and rigidly secured in place by bolts 19, see Figure 1, carried by the radial flange 18 and screwed into complemental holes in the copper flange 14. These bolts are insulated in any preferred way from the flange 18.

30 represents a copper flange formed with a central aperture that is adapted to fit snugly on the end of the copper hub 15. In practice, the flange 30 is pressed on the copper hub 15 and further secured in place by a key 31. The copper flange 30 is formed upon its periphery with a series of radial arms 32. Each arm 32 is arranged axially opposite and in close proximity to a companion arm 16. The copper flange 30 is formed near the base of the arms 32 with an inwardly extending annular flange 33 arranged opposite the annular extension 17 of the copper flange 14. The extensions 17 and 33, extending inwardly, form on the inner walls of the flanges 14 and 30 an annular chamber, in which is arranged the transformer core and its primary winding.

This core, see Figures 5, 6 and 7, consists of a series of annular plates 40. These plates are composed of soft iron, insulated from one another, as is common. These plates are arranged, one upon the other, between two binding plates 41. Bolts and rivets 42 serve to clamp securely together the several plates 40 between the binding plates 41. The bolts and rivets 42 are insulated from the plates 40 by a bushing 43 of insulating material and washers 44 of insulating material, in a way well known in the art. About the core thus formed is wrapped the wire 45 of the primary circuit. This may be applied in any well known or approved way. In Figure 6, the wire 45 of the primary circuit is wrapped around the core with its coil closely and regularly positioned. In Figure 5, the wire 45 of the primary circuit, instead of being arranged in plain wraps around the core, as in Figure 6, is arranged in a series of groups of wraps, each group consisting of a plurality of wraps around the core and a second plurality of wraps resting on the first series. In Figures 5 and 6, the primary winding is continuous all around the core, the substantial difference being that in Figure 6 the winding is in one layer, while in Figure 5 the winding is divided into groups consisting of two layers of winding. In both cases, however, the entire winding is energized for each welding operation. In Figure 39, I show a different arrangement of winding. In this figure the primary winding is arranged in groups consisting of two or more super-imposed layers of the primary winding to each group being independent of the other. Under this arrangement there might be a group of such windings for each welding jaw or for a plurality of such jaws. In such case each group should consist of enough wires to give the desired voltage of welding current; the number of wraps of the primary winding in such a case would be a matter well known to those skilled in the art and requires no discussion. In this form, instead of the entire winding of the core being energized, only the group winding for the particular welding jaw is energized, thus concentrating the action of the primary winding for one thing and increasing its proximity to its particular welding jaw for another thing. Instead of having a group of primary windings for each welding jaw, there may be a group for two or more jaws. The number of groups can be increased or diminished as desired. As stated, the purpose of grouping the wires, as in Figure 39, is to increase the efficiency of the core near each particular pair of jaws at the period of welding.

50, see Figures 2 and 9, represents a wheel of iron or any other suitable material, formed with a hub 51 arranged upon the shaft 10 and secured thereto by a key 52 arranged in a complemental spline or keyway in the shaft and hub. A set screw 53 in the hub engages the key 52 and securely binds the parts together. 54 represents a layer of insulating material arranged upon the periphery of the wheel 50. 55 represents an annular or tire-shaped ring of conducting material securely mounted upon the wheel 50, with the insulating material 54 between the periphery of the wheel and the ring 55. The arrangement of parts is such that the wheel 50 turns in unison with the hub 11 and the parts carried thereby.

56 represents a terminal consisting of a copper plug formed with a hole, in which is arranged a bolt 57 securing it to the ring 55. 58 is a tube of insulating material containing one end of the wire of the primary circuit extending from the core, the end of said wire being connected to the terminal 56. By this construction, one end of the primary winding of the core is electrically connected to the conducting ring 55.

60 (see Figures 1, 2 and 13) represents a metallic annular ring secured by bolts 61 to the outer face of the copper flange 14. The ring 60 is formed with an outwardly extending flange 62. The outer face of the flange 62, instead of being circular, is formed with a series of polygonal faces of different circumferential length. To half or one set of these faces are positioned blocks 63 of insulating material by means of pins 64. The blocks of insulating material are spaced apart, and between each pair of blocks 63 is arranged a block 65 of conducting material. These blocks 65 are secured to the flange 62 by means of cap screws 66. 67 represents a sheet of insulating material arranged between each block 65 and the flange 62. A bushing 68 of insulating material is arranged around each cap screw 66 in the flange 62. 69 represents a washer of insulating material arranged on each cap screw 66 between the head of the cap screw and the flange 62. By the construction described, the blocks 65 of conducting material are securely fastened to the flange 62, but insulated therefrom and further insulated from one another by means of the block 63. The outer faces of the blocks 65 and 63 represent parts of the same circle and constitute a path of travel of a brush 70 of conducting material for conducting the primary circuit to the blocks 65. It is further to be noted that the blocks 63 and 65 have their contiguous faces out of the radial line in a dovetailed form, whereby the cap screws 66 not only lock the blocks 65 to the flange 62 but also lock the blocks 63 to the said flange.

71, Figure 9, represents a brush adapted to engage the periphery of the copper ring 55, thus establishing a circuit between said ring and the source of power by means of the wire 72. Each of the brushes 70 and 71 are provided with the following mechanism for supporting the brushes and adjusting their contact with their respective copper rings. 73 represents a bracket adjustably secured to the framework of the machine by bolts 74. 75 represents an arm pivoted by a bolt 76 to the end of the bracket 73. The bolt 76 is insulated from the bracket 73, and the latter is insulated from the arm 75 in any preferred and well known way. The outer end of this arm 75 is formed with a socket 77 to slidingly receive and hold the brush 71. 79 represents an arm, one end of which is mounted on a stud 79ª carried by the end of the arm 75. A spring adjusting device 78 connected to the pivoted end of the arm 79 serves as a means to press down the roller 80 of the arm 79 against the end of the brush 71 at any desired tension and thus keep the free end of the brush 71 in contact with the ring 55. By this construction, the pressure of the brush 71 on the face of the copper ring 55 can be adjusted as desired.

To each of the blocks 65 is secured a terminal 81 by means of a cap screw 82, in the usual way, to which is connected one end of a conducting wire 83 protected by insulating material 84 in the usual way. The opposite end of each wire 83, see Figures 27 and 40, is connected to a rod of conducting material 85 by means of nuts 86, 86. The opposite end 87 of the rod 85 is enlarged and forms a contact member of one of the break switches. This rod 85 is carried in a bushing 88 of insulating material. This bushing, in turn, is arranged in an aperture formed in a lug 89 projecting from the outer face of the copper arm 16, being the left hand face in Figure 2 and the front face in Figure 1. By this construction, the primary circuit is completed from one of the blocks 65 to the contact member 87. As shown in Figure 4, the bushing 88 is cored out to form a chamber in which is arranged a coiled spring 88ª about the rod 85, one end of the spring resting against the rear face of the contact member 87. The opposite end of the spring rests against the rear wall of the chamber. This spring serves to permit the yielding engagement of the movable contact member 112 with the contact member 87 and to likewise increase the distance in which the movable contact member 112 may make contact with the member 87.

90 (see Figures 27 and 29) represents an irregular shaped lever formed with a hub 91 midway its ends and with two alined hubs 92, 93 at its lower end. The upper end of this lever is provided with a steel facing 94 for contact with a roller 95, see Figure 1, carried by a bracket 96 secured to a stationary girt 97 of the framework. The hub 93 is formed with a rearwardly projecting arm 98, see Figure 30, carrying on its upper face a steel plate 99, while 100 represents a rearward extension of the arm 98 below and beyond the plate 99. The hubs 92, 93 are arranged on each side of one of the radial arms 16 (see Figure 41), and on either side of a hub 101 formed in the arm 16. A bushing 102 of insulating material is arranged in the hub 101. A washer 103 of insulating material rests against the outer or left face of the hub 101. 104 represents a washer of insulating material arranged upon the inner end of the bushing 102 and against the right hand or inner face of the hub 101. 105 represents a hub on one of the companion radial arms 32 and in line with the hub 101. 106 represents a bushing of insulating material formed with a flange 107. This bushing is arranged in the hub 105 with the flange 107 against the outer or right hand face of the hub. 108 represents a washer of insulating material arranged on the inner end of the bushing 106, or the left hand end in Figure 41, and against the inner face of the hub 105. 109 represents a pin passed through the hubs 92, 93, the bushings 102, 106, and the washers 104, 108. 110, 111 represent cotters arranged in suitable apertures in the ends of the pin 109, as shown, in order to maintain the pin in place in the hubs 92, 93. While the above description is given as to a lever carried by one pair of radial arms 16 and 32, it is to be understood that each pair of radial arms is provided with a like lever mounted in the way above described.

Referring to Sheet 2, Figure 4, Sheet 9, Figures 27, 32 and 34, and Sheet 12, Figure 40, 112 represents a contact member formed with a rod of conducting material 113 arranged in a bushing 114, that in turn is arranged in the hub 91. 115 represents a washer of insulating material between the left hand face of the contact member 112 and the hub 91 in Figure 27. 116 represents a terminal formed with an aperture arranged upon one end of the rod 113 of conducting material, the opposite end of the rod being enlarged and constituting a contact member 112. The terminal 116 is held in place on the rod 113 by a nut 117 in the usual way. 118 is a washer of insulating material arranged between the terminal 116 and the hub 91. 119, Figures 4, 27 and 34, represents a short cylindrical piece of insulating fibre carrying midway its ends an integral ring 120. One end of this cylindrical piece is arranged in the hub 121 of the lever 90. The opposite end of this cylindrical piece is engaged by one end of a coiled spring 122, the opposite end of said coiled spring engaging a like cylindrical member 119 carried by an extension 123 of the lug 89. The function of this spring is to separate the contact members 87 and 112 when the lever 90 is released from a catch member hereafter described.

Referring to Figure 28, 124 represents a bell crank lever formed with a hub 125 mounted upon a pin 126 carried by one of the radial arms 32 that is complemental to one of the arms 16 and arranged beside the same, as in Figure 2. The lower end of the vertical arm of this bell crank is provided with a steel plate 127 formed with a reduced end 128 to provide a sharp catch shoulder 129 adapted for engagement with the right hand edge of the plate 99 carried by the lever 90. 130 represents a coiled spring, one end of which is carried by an end of the cylindrical member 119, like that shown in Figure 34, said member being secured at its opposite end by a lug 132 secured to the arm 16. The opposite end of the spring 130 engages one end of the cylindrical member 119, like that shown in Figure 34, carried by the vertical arm of the bell crank 124 between the plate 127 and the hub 125. The function of the spring 130 is to move the plate 127 to the left, in Figure 28, in order to bring its edge 129 in engagement with the plate 99 in Figure 27. The end of the horizontal arm of the bell crank 124 is split, forming two ears 134, 135 (see Figure 3), one of which is provided with a screw-threaded hole in which is arranged a cap screw 136. 137 represents a cap screw used as an adjusting screw arranged in a suitable screw-threaded aperture formed on the opposing faces of the ears 134, 135 near their rear ends. By this construction, after the screw 137 is adjusted vertically to any desired position, it can be locked in its adjusted position by means of the screw 136. 138 represents two washers of insulating material, one being arranged on the pin 126 on either side of the hub 125, see Figure 3. As the machine operates, the shaft 10 turns in the direction of the arrow shown in Figure 1, or in the direction opposite to the hands of a watch. With reference to the period after the welding operation, the plate 94 on the end of the lever 90 engages the roll 95, which swings said plate to the right (Figures 1 and 27) depressing the opposite end of the lever and the plate 99, so that the edge 129 of the plate 127, by virtue of the action of the spring 130, will be snapped over the edge of the plate 99. This action brings the contact member 112 against the contact member 87 and closes the primary circuit at this point. The circuit at this point will remain closed until after the welding operation of that particular pair of jaws has proceeded to a point where the metal being welded softens and the upper pair of jaws, hereinafter described, move toward the lower pair, when a lug 140 carried by one of the upper and complemental welding bridge pieces 142 descends by virtue of the action of the spring 181 of said jaws, the lug 140 engaging the adjustable screw 137, turning the bell crank 124 on the pin 126 and swinging the plate 128 to the right, in Figure 28, away from the plate 99 and permitting the spring 122, Figure 27, to swing the contact member 112 away from the contact member 87. Referring to Figures 3, 14 and 15, the forward edge of each arm 16 is formed with two ears 150, 150. 151 represents a cylindrical rod of copper screw-threaded adapted to engage complemental screw threads on the inner faces of the ears 150, 150 and to be adjusted up and down. This rod constitutes a welding die formed to support the strand wire. 153 is a cap screw arranged in complemental apertures in the ends of the ears 150, 150 beyond the cylindrical copper rod whereby when said rod 151 has been adjusted to the point desired it can be locked in said adjustment by said cap screw 153.

Referring to Figures 16 and 17, the radial arms 32 are each on their forward edge formed with ears 155, 155, in which is arranged a welding die 156 like the welding die 151 and in like manner held in its adjusted position by a cap screw 157. To the top of each arm 16 and 32 is secured a steel plate 158 by means of a pin 159 and complemental dovetailed members between the plate and top of the arm. This plate on its top face is formed with a longitudinal groove 160, in which the strand wires rest. Referring to Figures 14 to 18, 162 represents a hub formed with an extension 163 arranged on a pin 164 carried by a lug at the upper end of each arm 16 and 32. The hub 162 is formed with an arm 164$^a$. To the front and lower face of this arm is attached a steel feed dog 165 by means of screws 166, 166. 167 represents insulating material between the dog 165 and the arm 164$^a$. A spring 167$^a$ is connected to the arm 164$^a$ in such a way as to yieldingly throw the dog 165 downward so that it will be in position to engage the stay wire as its arms 16 and 32 move forward and carry said stay wire on the strand wire and in proper position over the welding jaws 151 and 156 until such stay wire is engaged by the upper welding jaws. It is to be understood that each pair of arms 16 and 32 is equipped with the welding dies and feed dogs heretofore described.

Referring to Figures 1 and 2, and Sheet 8, Figures 19 to 26, the upper shaft 9 or shaft C⁷ of my prior patent carries a series of hubs 170 secured to said shaft 9 and rotated thereby in the direction of the arrow in Figure 1, there being a hub 170 on the shaft 9 over each hub 11 on the shaft 10. Each hub 170 is formed with a series of axially arranged radial arms 171 supporting upon one face a radially arranged plate 171ᵃ, see Figures 1 and 20. This plate 171ᵃ is formed with two concentric rings 172, 173. The inner ring 172 is formed with a series of holes 174, while the outer ring 173 is formed with a series of open rectangular grooves 175, the holes 174 and the grooves 175 being radially arranged. 176, Figure 21, represents a rod formed at its outer end with a rectangular plunger head 177 adapted to be slidingly arranged in a complemental groove 175 and held in place by a cap 178 secured by cap screws 179 to the ring 173, see Figure 1. The inner end of the rod 176 is arranged in a complemental hole 174. A nut 180 on the end of said rod engaging the inner face of the ring 172 serves as a means of adjusting the tension of the coiled spring 181. This spring is arranged on the rod 176 with one end engaging the outer face of the ring 172, while the outer end of this spring engages the rear of the plunger head 177. By this construction, the plunger head 177 is given a yielding motion toward the shaft 9 with a predetermined resistance. It is to be understood the hub 170 carries a series of these yielding plunger heads 177 which correspond in number to the pairs of welding jaws on the shaft 10, as in my prior patent.

Referring to Figures 21 and 25, the lower end of the plunger head 177 is formed with a head 182. A complemental head or plate 183 is secured to the head 182 by screws 184, 184, the latter being insulated from the head 182 by a bushing 185 and a washer 185ᵃ of insulating material, in the usual way, while the heads or plates 182 and 183 are insulated from each other by insulating material 186. The head 183 is formed with two parallel ears 187, 187. Between these ears is arranged a tongue 188 pivoted to said ears by a pin 189 passing through suitable holes in said ears and a hardened steel bushing 191. 191, see Figure 25, represents a hardened steel bushing arranged in the hub 190. The hole in the bushing 191 is beveled and enlarged at each end in order to give the tongue 188 a slight rocking motion on the pin 189. This tongue 188 beyond the hub 190 carries a bridge piece 142, to the lower face of which are secured the upper electrodes 143, 144 by means of a clamp 192. This bridge piece in front of the electrodes 143, 144 carries a lug 140 heretofore described. By means of the enlargement of the hole in the bushing 191, as above stated, the electrodes 143, 144 are permitted a slight rocking motion to compensate for any inequalities in the thickness of the material being welded or any inequalities in the welds.

The rear end of the tongue 188 is formed with a cup-shaped depression or bearing 193, see Figure 22, adapted to receive a head 198 on the lower end of a pressure bolt 194, see Figure 1. The upper end of this bolt is arranged in a suitable aperture in a flange 195 of the plate 171ᵃ. 196 represents a bushing of insulating material between the aperture in the flange 195 and the guiding bolt 194 to insulate the bolt from the flange 195. A coiled spring 197 arranged on the bolt 194 between the head 198 of this bolt and the bushing 196 serves to yieldingly press the head 198 against the bearing 193 and thus rock the electrodes 143, 144 on their pivot 189 yieldingly toward the axis of the shaft 9. It is to be understood that the tongue 188 and the bridge piece 142 are of copper or other suitable material and that the electrodes 143, 144 are also of copper or other suitable material. The bridge piece 142 and the electrodes 143, 144 constitute what might be termed one of the upper welding jaws, there being a series of such upper welding jaws radially arranged around the shaft 9 to correspond to the number of pairs of welding jaws carried by the shaft 10.

200 represents a roll formed at each end with a flange 201. This roll is mounted between the arms 16 and 32 upon a pin 202 carried by said arms, see Figures 2 and 3. This roll is insulated from the arms. The pins also are insulated from the arms. Referring to Figure 1, in the operation of the machine these rolls engage the lower end of the tongue 188 as the welding dies approach each other, tipping the tongue 188 and forcing the welding dies 143, 144 toward the lower welding dies, gripping the stay wire to the strand wire between said dies.

In the operation of the machine, as in my prior patent, the strand wires and stay wires are fed between the welding jaws by any preferred means, the strand wire feed giving to the strand wires a speed corresponding to the peripheral speed of the welding dies on the shaft 10, such dies having the same peripheral speed as the welding dies on the upper shaft 9, as in my prior patent; after the strand and stay wires are gripped by the complemental opposing electrodes, the primary circuit is closed through a contact like 65 corresponding to that particular set of welding jaws; as the metal softens and the spring 181 forces the upper electrodes downward to upset the weld, the lug 140 on the bridge piece 142 engages and presses down the screw 137, Figure 28, thereby pulling the shoulder 129 off the plate 99 and permitting the spring 122 to throw the lever 90 to the left in Figure 27, thus instantly withdrawing the contact member 112 away from the stationary contact member 87 and breaking the primary circuit; in this operation, the path of movement of the bridge piece carrying the upper welding electrodes corresponds during the welding action to the path of movement of the lower complemental welding jaws. By means of the rotating transformer, the current is stepped down and applied to the electrodes in a much simpler manner and with higher efficiency than by the prior stationary transformers or the revoluble transformer of the prior Perry patent, the efficiency of all of which was impaired by the remoteness of the transformers from their electrodes and by the sliding contacts introduced into the secondary circuit.

I claim:

1. In an electric welding machine, a rotating transformer, a series of welding jaws connected to each branch of the secondary circuit of said transformer, and complemental welding jaws for each of said sets of welding jaws.

2. A welding jaw lever comprising a hub, a boss carried by said hub, a rib carried by the bottom of said boss, a copper bar carried by said hub opposite said boss, and a welding die supported at each end of said bar.

3. In an electric welding machine, a rotary welding jaw, a yieldingly mounted pivoted complemental welding jaw and a roller arranged to engage said last mentioned jaw at predetermined times to swing it to lock the work between said jaw and the first mentioned jaw.

4. In an electric welding machine, a pair of welding jaws arranged upon opposite sides of the work, a lever pivoted upon one side of said jaws carrying a primary contact member, a complemental yieldingly mounted primary contact member carried by said jaw, a second pivoted lever carried by said jaw, complemental interlocking means upon the ends of said levers arranged to hold the contact members together, and means carried by the complemental welding jaw on the softening of the metal to operate said second mentioned lever to disengage the locking connections and permit the breaking of the primary circuit by separating said contact members.

5. An electric welding machine comprising a pair of welding jaws, a source of power, a rotating transformer, connections between said jaws and the secondary circuit of said transformer, means comprising a part arranged to travel in timed relation with said transformer for connecting the source of power to one end of the primary winding of the transformer, and means including a part arranged to travel in timed relation with said transformer for connecting the other end of said primary winding to the source of power.

6. An electric welding machine comprising a rotating transformer, a source of power, means including a part arranged to travel in timed relation with said transformer for connecting said source of power to one end of the primary winding of the transformer, and means including a part arranged to travel in timed relation with said transformer for connecting the other end of said primary winding to the source of power.

7. In an electric welding machine, a rotating transformer, a source of power, means including a brush and ring of conducting material one of which is arranged to travel in timed relation with said transformer for connecting said source of power to the primary winding of the transformer, and means including a second ring and brush of conducting material one of which is arranged to travel in timed relation with said transformer for connecting said primary winding to the source of power.

8. An electric welding machine comprising a rotating transformer, a ring of conducting material arranged to travel in timed relation with said transformer, a source of power, connections between said source of power and said ring, and connections between said ring and the primary winding of said transformer, a second ring of conducting material arranged to travel in timed relation with said transformer, connections between the primary winding of said transformer and said second ring, and connections between said second ring and the source of power.

9. An electric welding machine comprising a rotating transformer, a source of power, a ring of conducting material arranged to travel in timed relation with said transformer, connections between said source of power and said ring, connections between said ring and the primary winding of said transformer, a second ring of conducting material arranged to travel in timed relation with said transformer, connections between said primary winding and said last-mentioned ring, and connections between said ring and the source of power, one of said rings being provided upon its conducting surface with one or more insulated or nonconducting spaces to interrupt the primary current at predetermined times.

10. An electric welding machine comprising a rotating transformer, a source of power, a ring of conducting material arranged to travel in timed relation with said transformer, connections between said source of power and said ring, connections between said ring and the primary winding of said transformer, a second ring of conducting material arranged to travel in timed relation with said transformer, connections between said primary winding and said last-mentioned ring, and connections between said ring and the source of power, and a plurality of insulated spaces upon the conducting surface of one of said rings to interrupt the primary current at predetermined spaces.

11. In an electric welding machine, a rotating transformer, a source of power, a ring of conducting material arranged to travel in timed relation with said transformer, connections between said source of power and said ring, connections between said ring and the primary winding of said transformer, a second ring arranged to travel in timed relation with said transformer, the periphery of said ring being composed of alternate sectors of conducting and non-conducting material, means for connecting the primary winding of said transformer with the conducting sectors of said ring, and means for connecting said sectors with the source of power.

12. In an electric welding machine, a transformer comprising a pair of copper discs electrically connected and mounted upon a shaft but insulated therefrom and adapted to be rotated thereby, a core composed of a series of iron rings also arranged upon and rotated by said shaft but insulated therefrom, a primary winding on said core, means carried by said shaft for connecting one terminal of said primary winding with the source of power, means carried by said shaft for connecting the other terminal of said primary winding with said source of power, said core being positioned with reference to said copper discs to set up an induced current in said copper discs upon the passage of the current through the primary winding, electrodes connected to said discs, a second shaft and complemental electrodes carried thereby to co-act with those carried by said transformer, a break switch and connections between one of said sets of jaws and said break switch to break the current upon the softening of the metal.

13. In an electric welding machine, a rotating shaft, a transformer arranged about said shaft and connected to but insulated from said shaft, a copper ring arranged about and connected to but insulated from said shaft, connections between said ring and the source of power, connections between said ring and the terminal of the primary winding of the transformer, a second ring arranged on and connected to but insulated from said shaft, said ring being composed of a series of copper blocks spaced apart and a block of insulating material between each pair of said copper blocks, means for connecting said copper blocks as the ring rotates to the source of power, a pair of welding jaws, and connections between one of said copper blocks and the primary winding of the transformer.

14. In an electric welding machine, a rotating shaft, a transformer mounted on said shaft and rotated thereby but insulated from said shaft, means on said shaft and rotated thereby for connecting one terminal of the primary winding of the transformer with the source of power, a contact wheel mounted on said shaft and rotated thereby, a contact block carried by said wheel but insulated therefrom, connections between said contact block and said source of power, a pair of welding jaws carried and electrically connected to said transformer and rotating therewith, a break switch adapted to be opened upon the softening of the metal, a non-slidable connection between said contact block and one terminal of said break switch, and a non-slidable connection between the other terminal of said break switch and the other terminal of the primary winding of the transformer.

15. In an electric welding machine, a copper hub mounted upon a shaft to rotate therewith but insulated therefrom, a copper disc carried by each end of said hub, a ring-shaped core and its primary winding associated with and arranged to rotate with said copper discs, a welding electrode at the extremity of each copper disc, a pair of welding electrodes arranged between the first two mentioned electrodes comprising a copper block formed with two welding faces, each end of said block being connected to one of said copper discs and the block insulated therefrom, a complemental welding head carrying two welding points for cooperating with two of said electrodes, a separate complemental welding head formed with two welding points adapted to co-act with the second set of the first mentioned electrodes.

16. In an electric welding machine, a rotating shaft, a copper ring carried by and rotating with said shaft but insulated therefrom, connections between said ring and a source of power, a transformer arranged about said shaft and connected thereto but insulated therefrom and adapted to be rotated therewith, a welding electrode carried by each terminal of said transformer, a complemental pair of welding electrodes connected together as a bridge piece for co-acting with the electrodes on the transformer, a break switch adapted to be operated by one of said electrodes upon the softening of the metal, a wheel mounted on said shaft and rotating therewith, a series of blocks of insulating material mounted upon the periphery of said wheel and spaced apart, a block of conducting material secured to the periphery of said wheel but insulated therefrom and arranged between each pair of blocks of insulating material, non-slidable connections between the copper ring and one terminal of the primary winding of the transformer, non-slidable connections between another terminal of the primary winding of the transformer and a contact member of the break switch, non-slidable connections between the other contact member of the break switch and a block of conducting material on said wheel.

17. In an electric welding machine, two welding jaws arranged side by side and electrically connected by a bridge piece and adapted to rotate on one side of the plane of the work, a rotating transformer arranged on the opposite side of the plane of the work and having its secondary formed with two parallel flanges, a welding jaw carried by one flange opposite a welding jaw carried by the other flange, means for causing the second set of jaws to co-act with the first set on the opposite side of the plane of the work, means whereby the jaws of one set are made to travel in a path corresponding to that of their complemental set during a predetermined period and to effect upsetting pressure upon the softening of the metal, means for connecting the primary winding of said transformer with the source of power, a break switch, and automatic means to operate said switch to break the primary circuit.

18. In an electric welding machine a rotatable shaft arranged upon one side of the plane of the work, two sets of radially disposed welding jaws carried by said shaft but insulated therefrom, the welding jaw of one set being opposite the welding jaw of the other set and electrically connected thereto by a bridge piece, a second rotatable shaft arranged upon the opposite side of the plane of the work, a transformer mounted upon said shaft to be rotated thereby but insulated therefrom, the secondary of said transformer comprising a copper hub provided at each end with a radially extending circular flange, each of said flanges carrying at its periphery a like series of radial arms or extensions, the arm of one of said series being opposite the arm of the other series, a welding jaw carried by each arm, two oppositely disposed welding jaws of each series being arranged to co-act with two jaws carried by the first shaft, means whereby a pair of jaws carried by one shaft are made to travel in a path corresponding to their complemental set of jaws on the other shaft during a predetermined period and to effect upsetting pressure upon the softening of the metal, means for connecting the primary winding of said transformer with a source of power, a break switch and automatic means to operate said switch to break the primary circuit.

19. In an electric welding machine, a rotatable shaft, a copper hub member rigidly mounted on said shaft but insulated therefrom, a rigidly disposed circular copper flange extending from each end of said hub, an annular transformer core, and its primary winding arranged between said flanges, and connected to a source of power, said hub, flanges, core and winding constituting a rotating transformer, connections between said primary winding and the source of power, each of said flanges carrying a series of arms positioned opposite the arms of the other flange, and a welding jaw electrically connected to each of said arms.

20. A transformer comprising a tubular hub having two discs arranged in proximity to each other to form an annular chamber between them, said hub and disc being composed of copper and each disc being electrically connected to the hub, the described structure being generally U-shaped in cross section and constituting a secondary circuit, an annular core arranged in said chamber, and a primary winding arranged upon said core.

21. In an electric welding machine, a rotatable shaft, a sleeve secured to said shaft, a copper hub mounted upon and rigidly connected to said sleeve but insulated therefrom, a rigidly disposed circular copper flange extending from each end of said hub, an annular transformer core, and its primary winding arranged between said flanges and connected to a source of power, said hub, flanges, core and winding constituting a rotating transformer, connections between said primary winding and the source of power, and a plurality of welding jaws carried by each flange.

In testimony whereof I have affixed my signature.

WILLIAM S. SOUTHWICK.